US010934691B2

(12) United States Patent
Thompson et al.

(10) Patent No.: US 10,934,691 B2
(45) Date of Patent: Mar. 2, 2021

(54) INTAKE FILTER FOR WATER COLLECTION SYSTEM WITH PRESSURE ACTIVATED BACKWASH VALVE

(71) Applicant: Greyter Water Systems Inc., Toronto (CA)

(72) Inventors: Christopher Roy Thompson, Barrie (CA); Michael Nelson Pereira Caldeira, Toronto (CA)

(73) Assignee: GREYTER WATER SYSTEMS INC., Toronto (CA)

( * ) Notice: Subject to any disclaimer, the term of this patent is extended or adjusted under 35 U.S.C. 154(b) by 0 days.

(21) Appl. No.: 16/078,250

(22) PCT Filed: Mar. 2, 2017

(86) PCT No.: PCT/CA2017/050283
§ 371 (c)(1),
(2) Date: Aug. 21, 2018

(87) PCT Pub. No.: WO2017/147711
PCT Pub. Date: Sep. 8, 2017

(65) Prior Publication Data
US 2019/0048563 A1    Feb. 14, 2019

Related U.S. Application Data

(60) Provisional application No. 62/302,988, filed on Mar. 3, 2016, provisional application No. 62/305,625, filed on Mar. 9, 2016.

(51) Int. Cl.
*E03B 1/04* (2006.01)
*C02F 1/00* (2006.01)
(Continued)

(52) U.S. Cl.
CPC ............ *E03B 1/042* (2013.01); *B01D 29/668* (2013.01); *B01D 35/143* (2013.01);
(Continued)

(58) Field of Classification Search
None
See application file for complete search history.

(56) References Cited

U.S. PATENT DOCUMENTS 5,066,393 A    11/1991 Padera et al.
5,578,213 A    11/1996 Miller et al.
(Continued)

FOREIGN PATENT DOCUMENTS

CA        2626171 A1    9/2009
DE    202009003118 U1    6/2009
(Continued)

OTHER PUBLICATIONS

European Patent Application No. 17759049.4, Office Action dated Sep. 24, 2019.
(Continued)

*Primary Examiner* — Richard C Gurtowski

(57) ABSTRACT

This specification describes an intake filter for use, for example, in a system that collects greywater from baths or showers for re-use in toilet flushing. The intake filter provides essentially dead-end filtration. An influent by-pass may be provided, but the filter is cleaned as required to reduce use of the by-pass. Cleaning is performed when permeability of the filter declines. An upstream sensor may be used to detect the permeability of the filter. In one cleaning method, flowing water, optionally with air, is used to backwash the filter. The impulse of the flowing water also moves one or more valves to direct backwash water to a sanitary drain. For example, pumped effluent may impinge against a first flap to close an effluent drain, the first flap
(Continued)

being mechanically linked to open a flap covering the sanitary drain.

11 Claims, 6 Drawing Sheets

(51) Int. Cl.
| | |
|---|---|
| E03D 5/00 | (2006.01) |
| B01D 29/66 | (2006.01) |
| B01D 35/143 | (2006.01) |
| B01D 35/147 | (2006.01) |
| C02F 1/28 | (2006.01) |
| C02F 1/44 | (2006.01) |
| C02F 1/68 | (2006.01) |
| C02F 1/76 | (2006.01) |
| C02F 103/00 | (2006.01) |
| E03C 1/26 | (2006.01) |

(52) U.S. Cl.
CPC ............ *B01D 35/147* (2013.01); *C02F 1/001* (2013.01); *C02F 1/008* (2013.01); *C02F 1/283* (2013.01); *C02F 1/44* (2013.01); *C02F 1/686* (2013.01); *C02F 1/76* (2013.01); *E03B 1/041* (2013.01); *E03D 5/003* (2013.01); *C02F 2103/002* (2013.01); *C02F 2209/03* (2013.01); *C02F 2209/40* (2013.01); *C02F 2209/42* (2013.01); *C02F 2303/16* (2013.01); *E03B 2001/045* (2013.01); *E03C 1/26* (2013.01); *Y02A 20/148* (2018.01); *Y02A 20/30* (2018.01)

(56) References Cited

U.S. PATENT DOCUMENTS

| | | | |
|---|---|---|---|
| 5,885,459 A | | 3/1999 | Lerche et al. |
| 8,377,291 B2 | | 2/2013 | Eckman |
| 2003/0111412 A1* | | 6/2003 | Jeong ................ C02F 3/06 |
| | | | 210/605 |
| 2007/0068879 A1 | | 3/2007 | Markle et al. |
| 2008/0173581 A1 | | 7/2008 | MacLean |
| 2010/0125938 A1 | | 5/2010 | Billon |
| 2010/0237021 A1* | | 9/2010 | Guttau ................ B01D 61/145 |
| | | | 210/739 |
| 2012/0067826 A1* | | 3/2012 | White ................ B01D 29/668 |
| | | | 210/741 |
| 2013/0126433 A1 | | 5/2013 | Wolff |
| 2014/0021112 A1 | | 1/2014 | Boodaghians et al. |
| 2015/0191365 A1* | | 7/2015 | Robb ................ C02F 1/76 |
| | | | 210/741 |
| 2016/0053425 A1 | | 2/2016 | Wolff |

FOREIGN PATENT DOCUMENTS

| | | |
|---|---|---|
| WO | 9730233 A1 | 8/1997 |
| WO | 2007103234 A2 | 9/2007 |
| WO | 2009022143 A1 | 2/2009 |
| WO | 2010096877 A1 | 9/2010 |
| WO | 2013181747 A1 | 12/2013 |

OTHER PUBLICATIONS

European Patent Application No. 17759049.4, Supplementary European Search Report dated Sep. 6, 2019.
European Patent Application No. 17759050.2, Partial Supplementary European Search Report dated Dec. 13, 2019.
Fravel et al., "Dynamic Improvements in Low Pressure Membranes and System Design," Water Online, Jan. 20, 2016, 6 pages. XP055575956. Retrieved from the Internet:[https://www.wateronline.com/doc/dynamic-improvements-in-low-pressure-membranes-and-system-design-0001].
International Patent Application No. PCT/CA2017/050282, International Search Report and Written Opinion dated May 19, 2017.
International Patent Application No. PCT/CA2017/050282, International Preliminary Report on Patentability dated Sep. 4, 2018.
International Patent Application No. PCT/CA2017/050283, International Search Report and Written Opinion dated May 16, 2017.
International Patent Application No. PCT/CA2017/050283, International Preliminary Report on Patentability dated Sep. 4, 2018.
Scheumann et al., "Influence of Hydraulic Retention Time on the Operation of a Submerged Membrane Sequencing Batch Reactor (SM-SBR) for the Treatment of Greywater," Desalination, vol. 246 (1-3), Sep. 2009, pp. 444-451, [retrieved on Aug. 12, 2009] XP026458452.
European Patent Application No. 17759050.2, Extended European Search Report dated Mar. 27, 2020.

\* cited by examiner

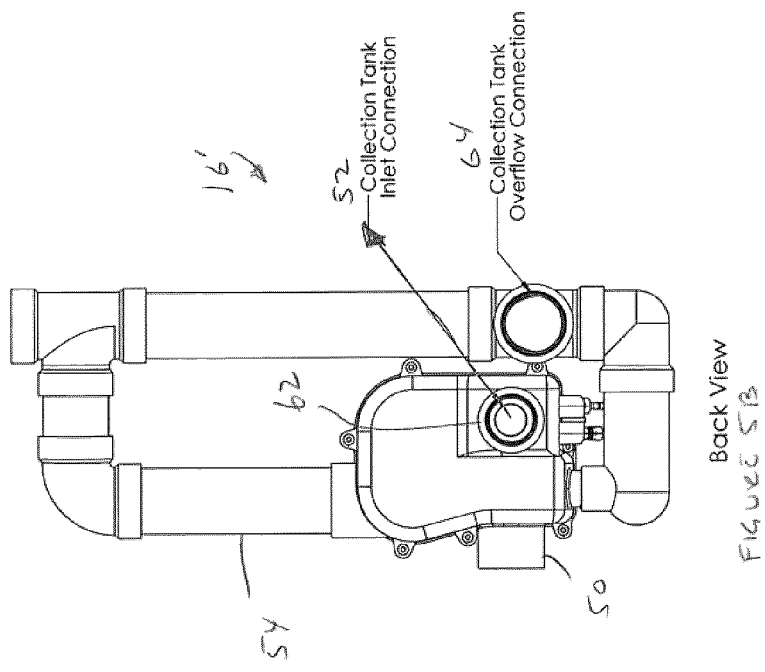
Figure 5B — Back View
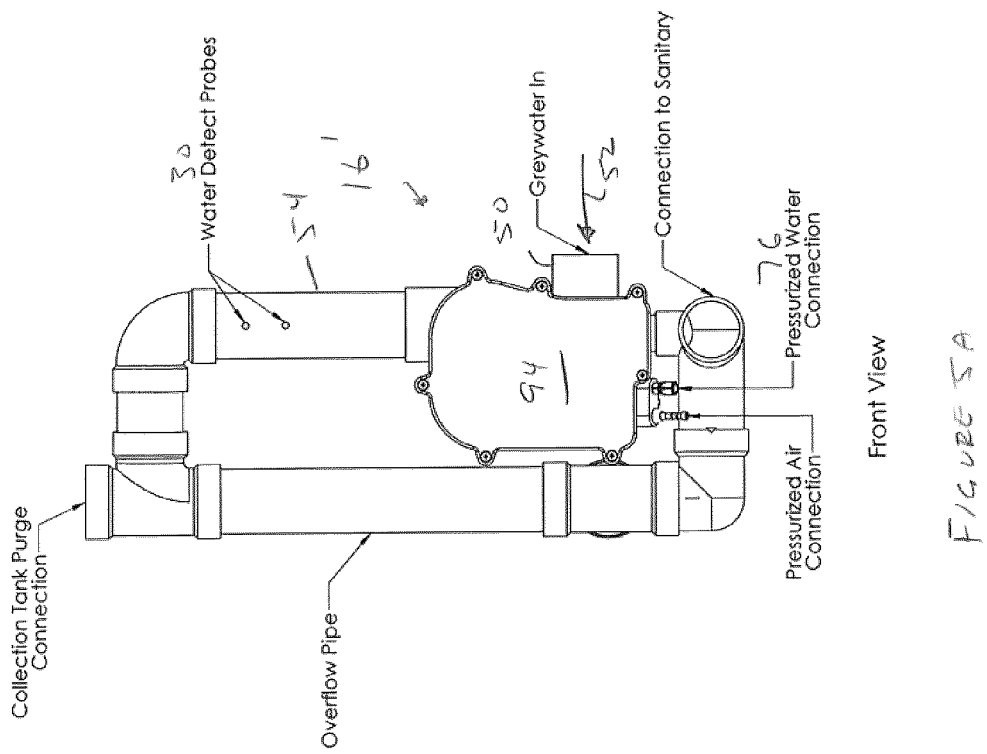
Figure 5A — Front View

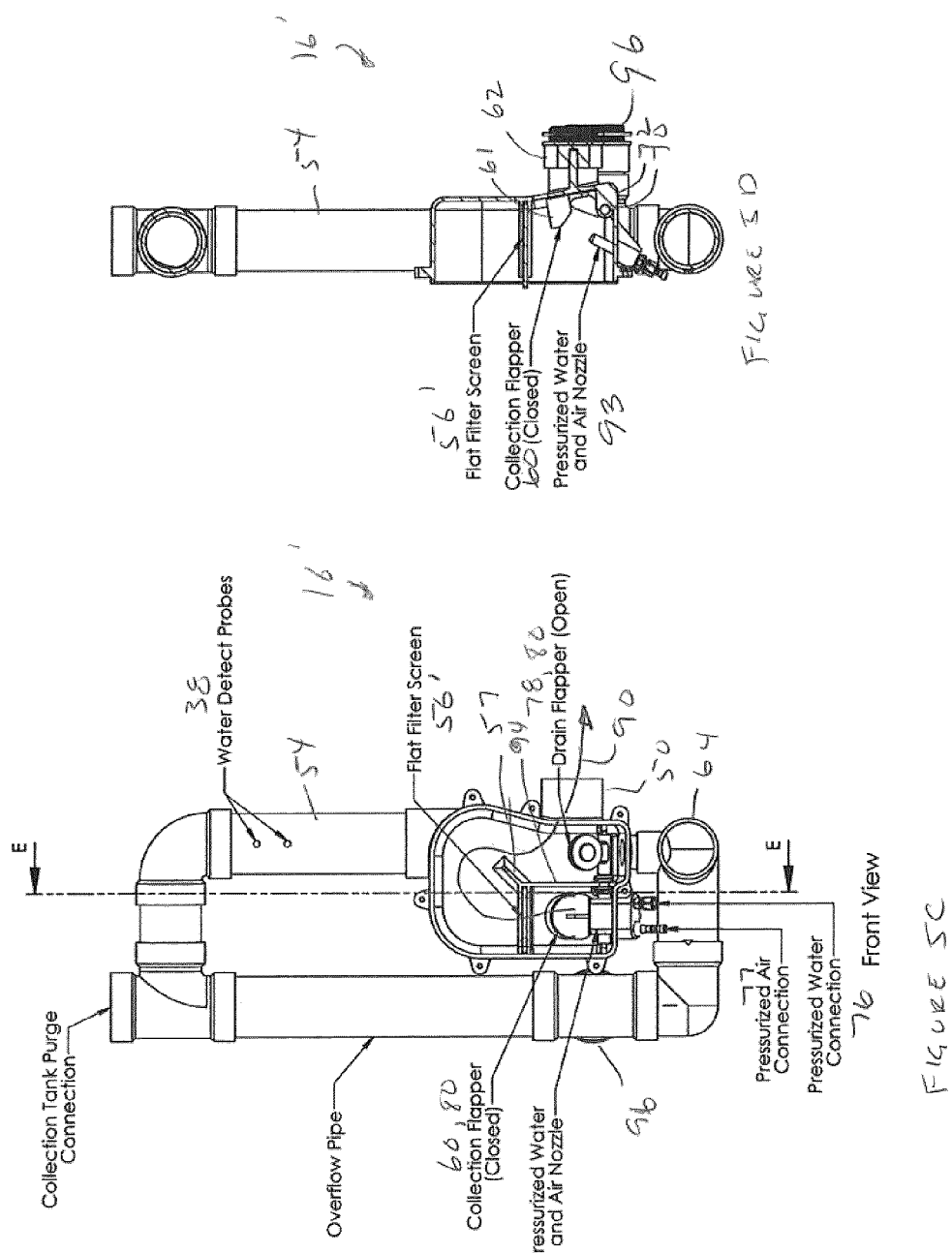

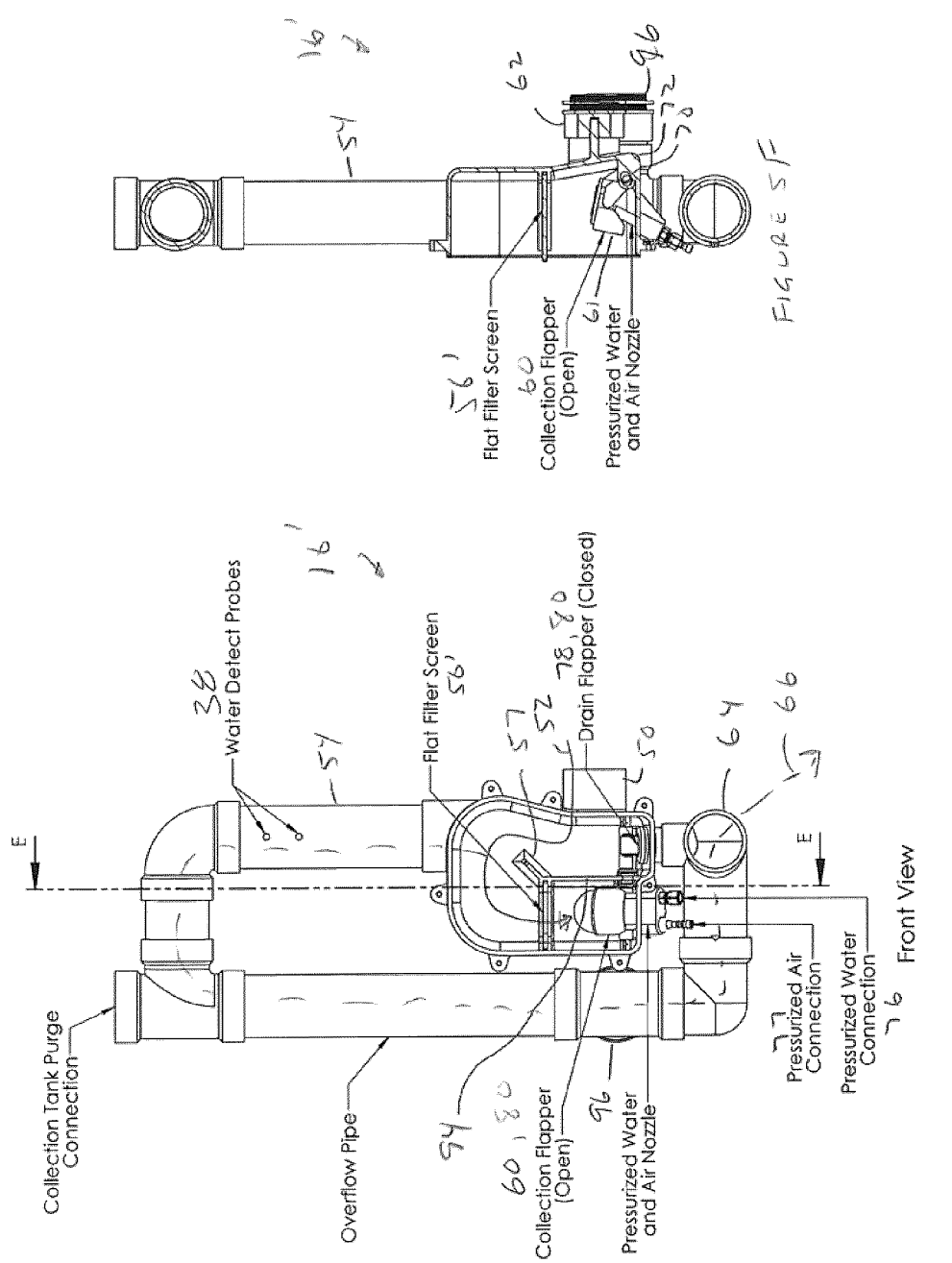

INTAKE FILTER FOR WATER COLLECTION SYSTEM WITH PRESSURE ACTIVATED BACKWASH VALVE

RELATED APPLICATIONS

This application is a National Stage Entry of International Application No. PCT/CA2017/050283, filed Mar. 2, 2017, which claims priority from U.S. provisional patent application 62/302,988 filed on Mar. 3, 2016 and U.S. provisional patent application 62/305,625 filed on Mar. 9, 2016, both of which are incorporated herein by reference.

FIELD

This specification relates to water filtration.

BACKGROUND

U.S. Pat. No. 8,377,291 describes a water recycling system that can be used for reclaiming and recycling grey water to provide water for landscaping or sanitary facilities such as a toilet. The water recycling system includes a tank, an influx pipe with a filter screen, and a pump. The filter screen covers an opening in the bottom of the influx pipe. The part of the influx pipe containing the filter screen is sloped. At least some influent water passing through the influx pipe falls through the filter screen to be collected in the tank. Any excess influent water continues past the filter screen and flows through the influx pipe to an external sanitary drain. When filtered water is drawn from the tank, a portion of it is sprayed against the bottom of the screen to force material off the filter screen and into the influx pipe.

INTRODUCTION

This specification describes an intake filter. The intake filter may be used, for example, in a grey water collection and recycling system, in particular a system that collects grey water from baths or showers or both for re-use in toilet flushing. The following paragraphs describe various features of the intake filter. However, a claimed invention may involve only a subset of the features in this summary, or a subset of features in this summary combined with one or more features in the detailed description to follow.

In brief, the intake filter provides essentially dead-end filtration during normal operation. An influent by-pass may be provided, but the by-pass is located at a material elevation (for example 10 cm or more above the top of the screen) or so as to provide a material upstream hold-up volume (for example 10 liters or more above the top of the screen). With such an elevated by-pass or hold-up volume, it is more likely that at least most of the water released from a shower (about 65 liters on average) will pass through the intake filter even if its filter element is partially fouled when compared to a system with open channel flow past the filter element. The ability to process the water released from a shower through a partially fouled filter element in turn allows the filter element to be cleaned less frequently. Cleaning a filter element consumes product or fresh water, and so every filter cleaning reduces the net amount of water collected through the intake filter. Preferably, cleaning is performed on an on-condition basis (based on an assessment of the condition of the filter element), for example when permeability of the filter element declines to a point at which the influent by-pass is being used, or is likely to be used soon. The condition of the filter can be determined indirectly by monitoring one or more hydraulic conditions (i.e. the presence or pressure of water) upstream of the filter element or in the influent by-pass. When the filter element is cleaned, for example by backwashing, a lower feed side outlet (lower than the influent by-pass) is opened to more efficiently remove solids from the intake filter. In an embodiment, a stream of pressurized water is used to backwash the filter and also moves one or more valves to direct backwash water to a sanitary drain. The water may move the one or more valves, and/or solids retained by the screen, by way or impulse, entraining a valve or solids in flow, flotation, or a combination of forces.

In a process described herein, influent water is filtered through a filter element. One or more sensors upstream of the filter element are monitored to determine if filter permeability has declined. For example, a sensor may check for the presence of water at a selected location upstream of the filter. If filter permeability has declined, the filter is cleaned, for example by releasing pressurized water on the downstream side of the filter. Optionally, pressurized water also impinges against, and moves, at least one valve. In one example, an effluent outlet valve is closed, which can cause the water to flow in a reverse direction through the screen, and a waste drain valve is opened.

In an apparatus described herein, a filter element is located between upstream and downstream conduit systems. The downstream conduit system has an effluent drain with a cooperating effluent drain valve. The upstream conduit system has a waste drain with a cooperating waste drain valve. The effluent drain valve is mechanically linked to the waste drain valve. A nozzle supplied with pressurized water is directed at the effluent drain valve. Optionally, the upstream conduit system has a sensor, for example a water proximity sensor.

Optionally, the pressurized water used to clean the filter may be assisted by air. The air can be mixed with the water to create a two-phase flow or there may be separate streams of air and water. The water can be mixed with air upstream of a nozzle, within a nozzle, or downstream of a nozzle that sprays the pressurized water into the filter.

BRIEF DESCRIPTION OF THE FIGURES

FIG. 5A is a front view of another intake filter.

FIG. 5B is a back view of the intake filter of FIG. 5A.

FIG. 5C is a front view of the intake filter of FIG. 5A with a front panel removed, an effluent valve closed and a waste drain valve open.

FIG. 5D is a sectioned view of the intake filter of FIG. 5C.

FIG. 5E is a front view of the intake filter of FIG. 5A with a front panel removed, an effluent valve open and a waste drain valve closed.

FIG. 5F is a sectioned view of the intake filter of FIG. 5E.

DETAILED DESCRIPTION

Figure 1:
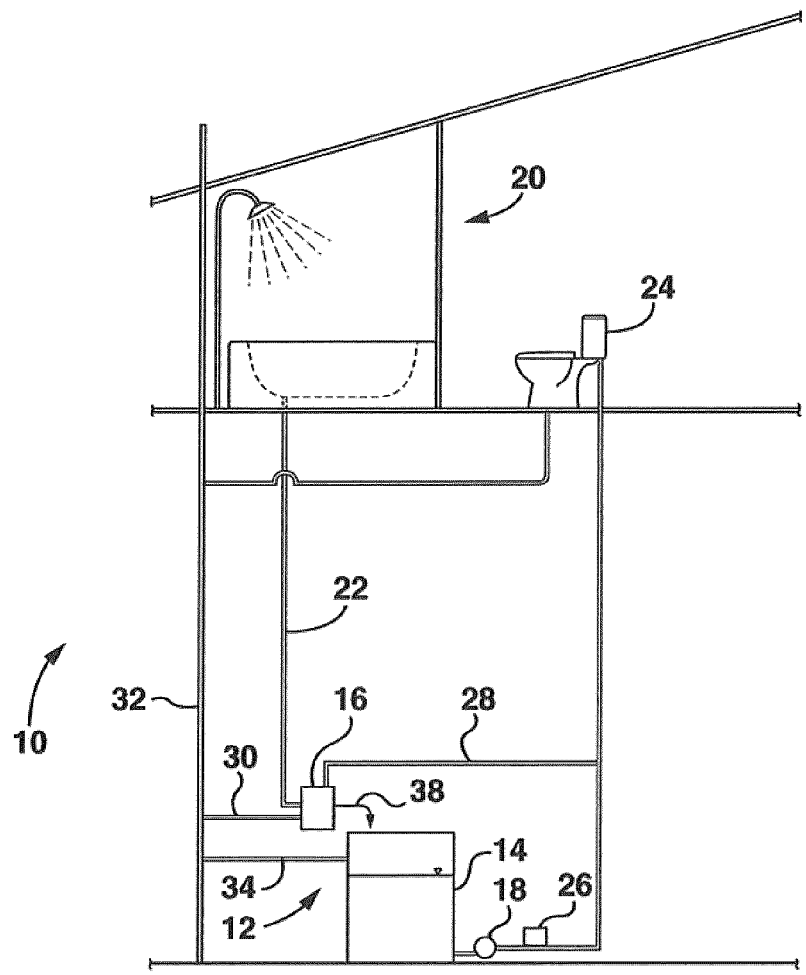
FIG. 1 is a schematic overview of a grey water recycling system in a house.

FIG. 1 shows a house 10 with a grey water recycling system 12. Grey water recycling system 12 has a collection tank 14, an intake filter 16 and a pump 18. Grey water collected from a bathtub or shower 20 flows down grey water drain 22 to the intake filter 16. Intake filter 16 filters the grey water and releases it through an effluent drain 38 to collection tank 14. For example, the intake filter 16 may separate solids, for example, hair, pieces of soap and other debris, from the grey water. Optionally, further treatment may occur in the collection tank 14, between the intake filter 16 and the collection tank 14 or after the collection tank 14. Pump 18 draws filtered water from the collection tank 14 and delivers it under pressure to a toilet 24. Pressure control unit 26 starts pump 18 when it senses a pressure at or below a pre-selected minimum and stops pump 18 when it senses a pressure at or above a pre-selected maximum. A pressurized supply line 28 directs pressurized water for backwashing to the intake filter 16 from the outlet of pump 18 or from another source, for example a municipal water supply or a well. A waste drain line 30 connects the intake filter to a sanitary drain stack 32. Sanitary drain stack 32 is connected to a sewer, septic system or other wastewater treatment system in or outside of the house 10. The collection tank 14 may also have a connection to a plumbing vent and an overflow line 34 connected to the sanitary drain stack 32.

Grey water flows automatically by gravity through the intake filter 16 to the collection tank 14 as the grey water is produced or soon after. Cleaning of the intake filter 16 occurs on an on-condition basis, for example based on the permeability of a filter element within the intake filter 16, which may be indicated by the use or anticipated use of a by-pass within the intake filter 16. Cleaning the intake filter 16 can be by way of a backwash using pressurized water, optionally assisted by air. Backwash waste water and water in the by-pass flow to the sanitary drain stack 32.

Figure 4:
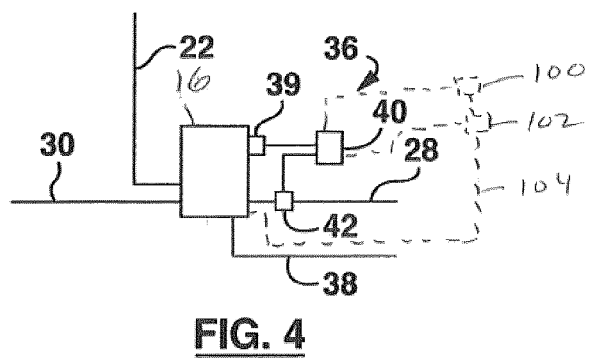
FIG. 4 is a schematic drawing of a control system for the intake filter of FIG. 2A or FIG. 5A.

FIG. 4 shows a control system 36 for the intake filter 16. The control system includes a sensor 39, controller 40 and supply valve 42. The sensor 39 monitors a condition related to the condition, for example permeability, of the intake filter 16 and sends signals to the controller 40. The controller 40 receives the signals and determines whether a backwash is required. When a backwash is required, the controller 40 opens supply valve 42, for example by energizing a solenoid. Water under pressure is then provided under pressure to the intake filter 16 for backwashing. Optionally, when a backwash is required, the controller 40 turns on air pump 100 (if air pump 100 is not already on, for example to assist in a further treatment process) and opens air valve 102. Compressed air flows through air supply line 104 to the intake filter 16. The compressed air may mix with water provided to the intake filter before reaching the intake filter 16, in a nozzle injecting the water and air into the intake filter 16, or after entering the intake filter 16. Further details of the flow of grey water and backwash water through examples of the intake filter 16 will be provided below.

Figure 2A:
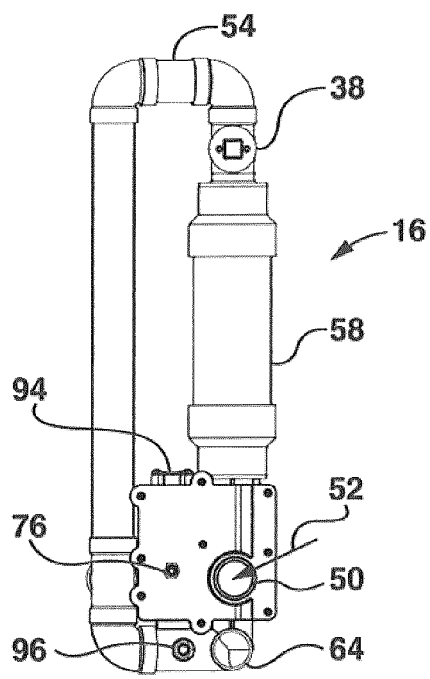
FIG. 2A is a front view of an intake filter.

FIGS. 2A to 3D show further details of a first example of an intake filter 16. Referring to FIGS. 2A, 2B and 2C, forward path 52 indicates the path of grey water through the intake filter during ordinary operation. Grey water from showers or baths enters the intake filter 16 through a grey water inlet 50. The grey water passes through a filter element 56, for example a cylindrical screen. After passing through the filter element 56, the filtered grey water passes by an effluent outlet valve 60 and leaves the intake filter 16 through a collection tank inlet connection 62. The filter element 56 can be removed for replacement or repair through access cover 94.

In the example shown, effluent outlet valve 60 is one flapper of a dual flapper assembly 80. The other flapper is waste valve 78. The two flappers 60, 78 share and extend from a common pin 70 rotating in bushings 72. Outlet valve 60, when moved to the position shown in FIG. 3D, covers and substantially seals the collection tank inlet connection 62. Under normal operation, the dual-flapper assembly 80 is in the position shown in FIGS. 3C and 2B. In this position, the dual-flapper assembly 80 allows incoming grey water to flow into the grey water inlet 50, through the filter element 56, and into the collection tank 14.

Depending on the condition of the filter element 56, incoming grey water may rise temporarily in part of a by-pass 54. Optionally, a portion of the by-pass 54 above the filter element 56 is made of a larger diameter pipe to provide a by-pass tank 58. When the filter element 56 begins to clog, part of the by-pass 54, and in particular the bypass tank 58, will temporarily retain a certain volume of water below the point of highest elevation of the by-pass 54. The part of the by-pass 54 upstream of its highest elevation acts as a buffer to allow more time, and increased static pressure, for the incoming grey water to pass through the filter element 56 instead of leaving the intake filter 16 through the by-pass 54. If the filter element 56 clogs completely, or nearly so, water may rise up above the bypass tank 58 to the level of sensor 38, which in this example is a water proximity sensor. Sensor 38 may be any sort of sensor that can send a signal when water is at, or near, the sensor. For example, sensor 38 could be a capacitive proximity sensor or an optical sensor.

Figure 2B:
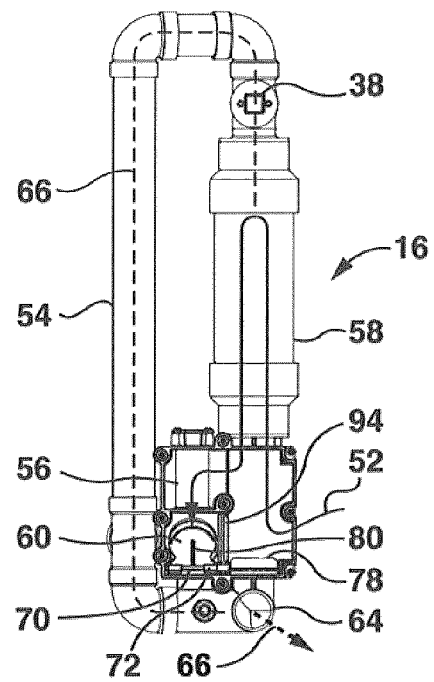
FIG. 2B is a front view of the intake filter of FIG. 2A with a front panel removed.
Figure 2C:
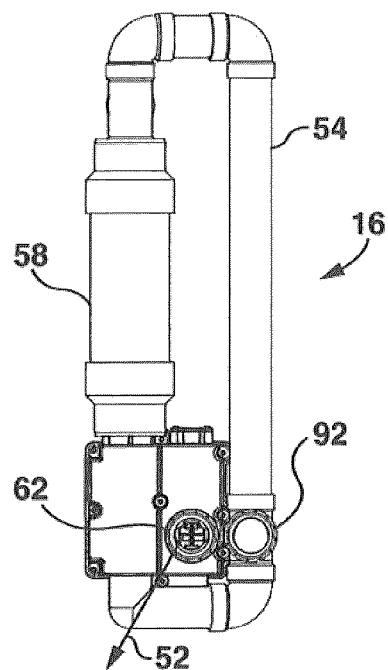
FIG. 2C is a back view of the intake filter of FIG. 2A.

Any grey water rising above the sensor 38 can by-pass the filter element 56 and leave through the rest of the by-pass 54 to a sanitary drain connection 64, as shown by the dashed overflow path 66 in FIG. 2B. Optionally, overflow line 34 from collection tank 14 can be connected to the by-pass 54 through collection tank overflow connection 92 (shown in FIG. 2C). Any collection tank overflow water then passes through sanitary drain connection 64 rather than being connected directly to sanitary drain stack 32 as shown in FIG. 1. An optional collection tank purge connection 96 to the by-pass 54 can be connected to pump 18 through a valve and pressurized supply line 28. Optionally, collection tank purge connection 96 can be connected to a separate, dedicate collection tank purge pump, particularly if there are intervening treatment units between collection tank 14 and pump 18. With either pump, the collection tank 14 can be drained through the sanitary drain connection 64 if required.

Water sensed at the elevation of sensor 38 indicates that grey water has by-passed the filter element 56 or is likely to by-pass the filter element 56 soon if the filter element 56 continues to foul. The filter element 56 is therefore cleaned after the sensor 39 detects water, for example by backwashing the filter element 56. Alternatively, a sensor could be placed in another location, for example in the by-pass 54 downstream of its point of highest elevation or in the grey water drain 22. In other alternatives, a sensor could measure water pressure, for example static head of water anywhere upstream of the filter element 56 or the activation of a one way valve (i.e. a sanitary check valve) in or downstream of the by-pass 54. In another alternative, a sensor could detect the presence of water at a location upstream of the filter element 56 and the controller 40 could measure the time that water is present in this location. This would provide a means of determining the time taken for water from a shower to pass through the filter element 56, which is an indicator of permeability or fouling condition.

Preferably, the controller 40 waits after receiving a signal from sensor 38 before cleaning the filter element 56. Optionally, a short wait period (for example 5 or 10 minutes) may allow grey water in the by-pass tank 58 to be filtered or allow water above waste valve 78 to drain. Alternatively, a longer wait period can be provided to delay cleaning until a time of day when a shower during the backwash is unlikely. After the wait period, controller 40 opens supply valve 42. Preferably, supply valve 42 is a solenoid connected to the outlet of pump 18, which allows the filter element 56 to be cleaned using filtered grey water. The pressurized supply line 28 is connected to a backwash water connection 76. When a backwash is activated, pressurized water pushes the outlet valve 60 into a position that prevents flow into the collection tank 14 and instead directs the pressurized water backwards through the filter element 56. Closing the outlet valve 60 preferably also opens a waste valve 78, the waste valve 78 being the other flapper of the dual flapper assembly 80. Waste valve 78, when closed, covers a port leading to the sanitary drain connection 64. Opening waste valve 78 connects the upstream side of the filter element 56 to the sanitary drain connection 64. This allows backwashed debris from filter element 56 to drain under gravity into the waste drain line 30 without having to flow over the point of highest elevation in by-pass 54. The controller 40 closes supply valve 42 to end the backwash, for example after a predetermined time from opening supply valve 42. In the absence of flowing water from the supply valve 42, the dual flapper assembly 80 returns to its normal position, for example by gravity or a spring, and the regular flow of grey water through the filter element 56 to the collection tank inlet 14 resumes with the next shower.

Figure 3A:
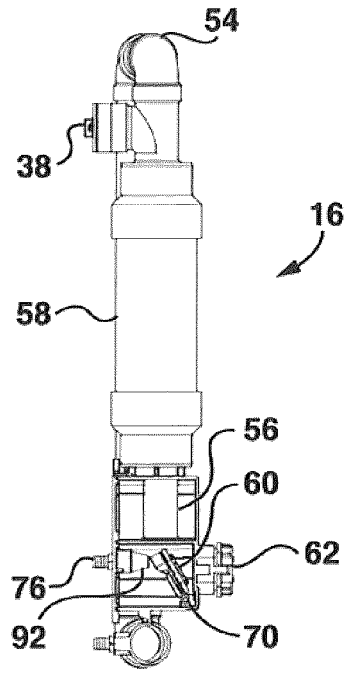
FIG. 3A is sectioned view of the intake filter of FIG. 2A showing an effluent valve in an open position.
Figure 3B:
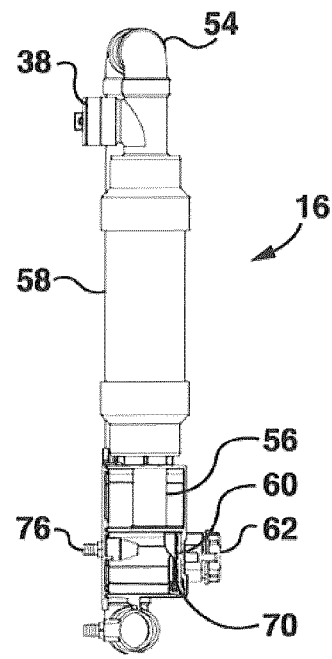
FIG. 3B is a sectioned view of the intake filter of FIG. 2A showing an effluent valve in a closed position.
Figure 3C:
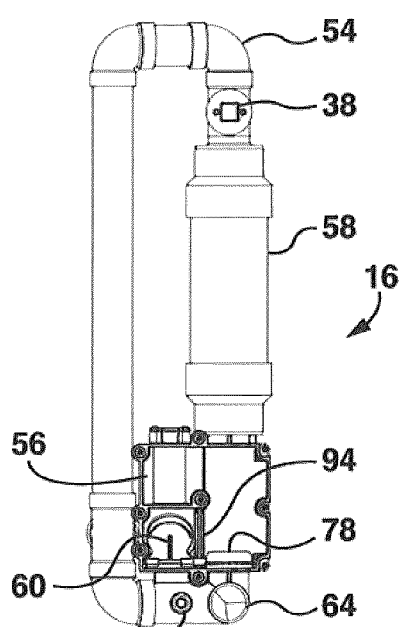
FIG. 3C is a front view of the intake filter of FIG. 2A with a front panel removed (a duplicate of FIG. 2B) reproduced for convenience and showing the effluent valve in an open position and a waste drain valve closed.
Figure 3D:
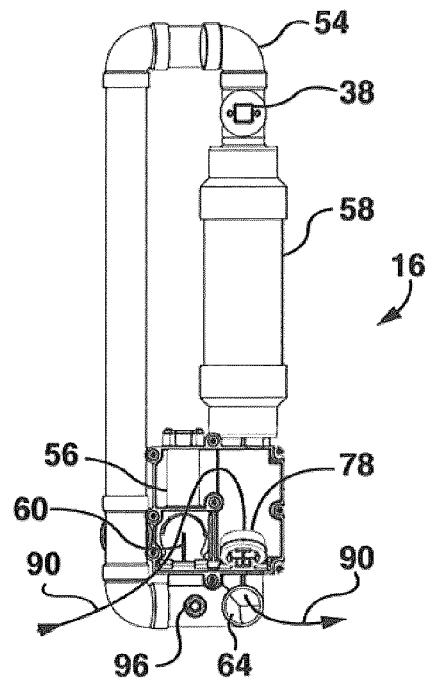
FIG. 3D is a front view of the intake filter of FIG. 2A with a front panel removed showing the effluent valve in a closed position and the waste drain valve in an open position.

The position of the dual flapper assembly 80 during a backwash is shown in FIG. 3D. In this position, pressurized water enters backwash water inlet 76 and then flows through the screen element 56 to the sanitary drain stack 32. The path of flowing water through the intake filter 16 is shown as backwash flow path 90 in FIG. 3D. As shown in FIGS. 3A and 3B, the backwash water inlet 76 may be connected to a nozzle 92 aimed at the outlet valve 60. The nozzle 90 helps direct the impulse of incoming pressurized water against the outlet valve 60. Optionally, a partition 94 separating the outlet valve 60 from waste valve 78 can have a small hole at or near its bottom edge, or the partition 94 could be porous and act as the filter element 56. This allows water above waste valve 78 to drain into the collection tank between showers, which makes it easier for incoming pressurized water to lift the waste valve 78.

FIGS. 5A to 5F show details of a second example of an intake filter 16. This second example will be referred to as second intake filter 16' in the description below and FIGS. 5A to 5F. Elements that are substantially unchanged from the features shown in FIGS. 2A to 3D will be given the same reference numbers in FIGS. 5A to 5F. Unless it is inconsistent with anything below, the description of an element of the first intake filter 16 of FIGS. 2A to 3D will apply to an element having the same reference number in FIGS. 5A to 5F.

The second intake filter 16' has a second filter element 56'. Second filter element 56' is a flat screen oriented horizontally. Optionally, second filter element 56' may slope downwards towards the waste valve 78. An optional dam 57, preferably extending above the highest point of second filter element 56', temporarily retains a small volume of water over the second filter element 56' during backwashing. This small volume of water can help wet solids that were retained by the screen. The small volume of water can also reduce the tendency for water to flow preferentially through relatively un-fouled or more easily cleaned parts of the second filter element. The dam 57 may optionally have a notch or spout (not shown) to help backwashed solids flow over the dam 57. Mixing the backwash water with air also helps backwashed solids flow over the dam 57. Solids retained by the second filter element 56' are removed primarily by being lifted upwards by water and air rising through the second filter element 56' after the volume within the second intake filter 16' downstream of the second filter element 56' is filled. Optionally, one or both of the water or air streams, or parts of one or both of the water or air stream, could be directed at the second filter element 56' to help dislodge retained solids.

The by-pass 54 of second intake filter 16' does not include a bypass tank 58. The part of the by-pass 54 upstream of its highest elevation has a plurality of sensors 38, for example 2, at different elevations. A lower sensor 38 may be used to activate a backwash. An upper sensor 38 may be used to send an alert that the second intake filter 16' should be inspected. A bathtub might be used for exceptional purposes, for example washing off paint or other chemicals or bathing a muddy, shedding dog, that in some combinations could require the second filter element 56' to need to be removed for manual cleaning.

During a backwash, the controller 40 opens supply valve 42, turns on air pump 100 and opens air valve 102, for example for a predetermined time. The air supply line 104 is connected to an air inlet 77. In the example shown, air inlet 77 and backwash water inlet 76 are connected to a nozzle 93 passing through a floor of the second intake filter 16' downstream of the second filter element 56'. The nozzle 93 does not mix the air and water but instead releases generally parallel streams of air and water both directed at the outlet valve 60. Optionally, the outlet valve 60 has a hood 61 to intercept the air and water even when the outlet valve 60 is closed. The water and air mix inside the second intake filter 16', generally before rising through the second filter element 56'. Alternatively, the air and water could be mixed together before they are injected into the second intake filter 16'.

The figures are intended to shown just some optional examples of an intake filer 16. An intake filter could also be made with various modifications. For example, additional or alternative pressurized water nozzles could clean a filter element by directing water across the upstream side of a filter element rather than backwashing the filter element. The filter element could be located within a pipe section rather than a rectangular box as shown. A flappers could extend downwards from an axle, open outwards rather than inwards, be orthogonal to another flapper, or be linked by a pushrod or other mechanical means to another flapper instead of having a common axle. One or more flappers could be actuated by mechanical, electrical, pneumatic or other actuators instead of moving in response to flowing water. In one option, an influx body with a filter element at the bottom (for example as described in U.S. Pat. No. 8,377,291) could have a flapper valve downstream of the filter element. A rotational sensor on the flapper valve can provide a signal (caused for example by a certain degree of rotation during a shower) indicating that an undesirable amount of water is flowing over rather than through the filter element, and that the filter element needs to be cleaned. An intake filter as described herein may be part of a grey water treatment system as described in U.S. provisional patent application 62/305,625 filed on Mar. 9, 2016.

We claim:

1. An intake filter comprising,
a filter element;
an upstream conduit system;
a downstream conduit system;
in the downstream conduit system, an effluent drain with a cooperating effluent outlet valve; and,
one or more of a) a pressurized water nozzle directed to introduce a spray of pressurized water into the downstream conduit system and to impinge the spray of pressurized water spray against the effluent outlet valve and b) in the upstream conduit system, a waste drain with a cooperating waste drain valve wherein the effluent outlet valve is mechanically linked to the waste drain valve, or both a) and b).

2. The intake filter of claim 1 further comprising one or more sensors in the upstream conduit system.

3. The intake filter of claim 2 wherein the one or more sensors comprises a water proximity sensor.

4. The intake filter of claim 1 wherein the upstream conduit system comprises an influent grey water by-pass connecting the upstream conduit system to a sanitary drain connection, wherein a portion of the influent grey-water by-pass is located 10 cm or more above the top of the filter element or so as to provide a hold-up volume of 10 liters or more of influent grey water above the top of the filter element.

5. The intake filter of claim 1 comprising a pressurized water nozzle directed to introduce a spray of pressurized water into the downstream conduit system and to impinge the spray of pressurized water spray against the effluent outlet valve.

6. The intake filter of claim 5 further comprising a waste drain with a cooperating waste drain valve in the upstream conduit system wherein the effluent outlet valve is mechanically linked to the waste drain valve.

7. The intake filter of claim 5 comprising a pressurized air nozzle directed into the downstream conduit system.

8. The intake filter of claim 7 wherein the pressurized air nozzle is directed at the effluent outlet valve.

9. A grey water recycling system comprising,
a filter element;
a downstream collection tank;
an upstream conduit system;
wherein the upstream conduit system comprises an influent grey water by-pass connecting the upstream conduit system to a sanitary drain connection, wherein a portion of the influent grey water by-pass is located 10 cm or more above the top of the filter element or so as to provide a hold-up volume of 10 liters or more of influent grey water above the top of the filter element.

10. The grey water recycling system of claim 9 further comprising,
a sensor associated with the upstream conduit system;
a pressurized water inlet valve; and,
a controller,
wherein the controller is configured to receive a signal from the sensor indicating the condition of the filter element and to open the pressurized water inlet valve, thereby backwashing the filter.

11. The system of claim 10 wherein the condition is a buildup of water upstream of or by-passing the filter element.

* * * * *